(12) United States Patent
Gillum et al.

(10) Patent No.: US 8,307,038 B2
(45) Date of Patent: Nov. 6, 2012

(54) EMAIL ADDRESSES RELEVANCE DETERMINATION AND USES

(75) Inventors: Eliot C. Gillum, Mountain View, CA (US); Steven D. Kafka, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 11/423,423

(22) Filed: Jun. 9, 2006

(65) Prior Publication Data

US 2007/0288575 A1 Dec. 13, 2007

(51) Int. Cl.
*G06F 15/16* (2006.01)
(52) U.S. Cl. .......................... 709/206; 709/207
(58) Field of Classification Search .................. 709/206, 709/207, 208
See application file for complete search history.

(56) References Cited

U.S. PATENT DOCUMENTS

| | | | |
|---|---|---|---|
| 6,421,709 B1 | 7/2002 | McCormick et al. | |
| 6,654,787 B1 | 11/2003 | Aronson et al. | |
| 7,257,564 B2 * | 8/2007 | Loughmiller et al. | 706/16 |
| 7,272,378 B2 | 9/2007 | Petry et al. | |
| 7,272,853 B2 | 9/2007 | Goodman et al. | |
| 7,290,033 B1 * | 10/2007 | Goldman et al. | 709/206 |
| 7,325,249 B2 | 1/2008 | Sutton et al. | |
| 7,406,506 B1 | 7/2008 | Sutton et al. | |
| 7,409,708 B2 | 8/2008 | Goodman et al. | |
| 7,444,380 B1 | 10/2008 | Diamond | |
| 7,458,014 B1 * | 11/2008 | Rubin et al. | 709/206 |
| 7,464,264 B2 | 12/2008 | Goodman et al. | |
| 7,469,292 B2 | 12/2008 | Landsman et al. | |
| 7,539,699 B2 * | 5/2009 | Kobashikawa et al. | 1/1 |
| 7,580,982 B2 | 8/2009 | Owen et al. | |
| 7,610,341 B2 | 10/2009 | Daniell | |
| 2002/0061761 A1 | 5/2002 | Maggenti et al. | |
| 2002/0143828 A1 | 10/2002 | Montero et al. | |
| 2003/0009698 A1 | 1/2003 | Lindeman et al. | |
| 2003/0182420 A1 | 9/2003 | Jones et al. | |
| 2004/0059786 A1 * | 3/2004 | Caughey | 709/206 |
| 2004/0186848 A1 * | 9/2004 | Kobashikawa et al. | 707/102 |
| 2004/0186896 A1 | 9/2004 | Daniell et al. | |
| 2004/0215726 A1 * | 10/2004 | Arning et al. | 709/206 |
| 2005/0080642 A1 | 4/2005 | Daniell | |
| 2005/0080862 A1 * | 4/2005 | Kent et al. | 709/206 |

(Continued)

FOREIGN PATENT DOCUMENTS

WO 01/65336 A2 9/2001

OTHER PUBLICATIONS

Office Action dated Apr. 9, 2009 in U.S. Appl. No. 11/625,819.

(Continued)

*Primary Examiner* — Larry Donaghue
*Assistant Examiner* — Aftab Nasir Khan
(74) *Attorney, Agent, or Firm* — Vierra Magen Marcus & DeNiro LLP

(57) ABSTRACT

A computer implemented method for assisting email users. The method determines the relevance of email addresses to users and utilizes the relevance information to assist users in addressing emails. The method may include gathering email addresses from one or more sources including inbound user emails associated with an email user, and determining a relevance of the email address to the user based on a heuristic. Once relevance is determined, the method includes applying relevant email addresses to a user's store of relevant addresses.

20 Claims, 7 Drawing Sheets

U.S. PATENT DOCUMENTS

| | | | |
|---|---|---|---|
| 2005/0080889 A1* | 4/2005 | Malik et al. | 709/223 |
| 2005/0097174 A1 | 5/2005 | Daniell | |
| 2005/0198144 A1* | 9/2005 | Kraenzel et al. | 709/206 |
| 2005/0198180 A1 | 9/2005 | Khanolkar et al. | |
| 2006/0093998 A1* | 5/2006 | Vertegaal | 434/236 |
| 2006/0095459 A1 | 5/2006 | Adelman et al. | |
| 2006/0095524 A1* | 5/2006 | Kay et al. | 709/206 |
| 2006/0095586 A1 | 5/2006 | Adelman et al. | |
| 2006/0129644 A1 | 6/2006 | Owen et al. | |
| 2006/0212522 A1* | 9/2006 | Walter et al. | 709/206 |
| 2007/0036296 A1 | 2/2007 | Flanagan et al. | |
| 2007/0061400 A1* | 3/2007 | Parsons | 709/206 |
| 2007/0156895 A1 | 7/2007 | Vuong | |
| 2007/0162847 A1* | 7/2007 | Tunning et al. | 715/533 |
| 2007/0208817 A1* | 9/2007 | Lund et al. | 709/206 |
| 2007/0282952 A1* | 12/2007 | Lund et al. | 709/206 |
| 2008/0016167 A1* | 1/2008 | Lund et al. | 709/206 |
| 2008/0313294 A1* | 12/2008 | Malone et al. | 709/206 |
| 2009/0070431 A1* | 3/2009 | Malik et al. | 709/206 |

OTHER PUBLICATIONS

Jennifer Glick, "Autocomplete Addressing", Mozilla Foundation, Mach V/Mozilla: Mail & News, http://www.mozilla.org/mailnews/specs/autocomplete/, Sep. 10, 2001.

Jeff Overton, "Outlook Express 5.0 for Mac Creating New Mail & Address Book", Mac Optoins Mac Solutions, OE5—New Mail & Address Book, http://www.macoptions.com/oe/newmail.htm, Somersworth, NH.

Response to Office Action filed Jul. 9, 2009 in U.S. Appl. No. 11/625,819.

Office Action dated Mar. 2, 2010 in U.S. Appl. No. 11/625,819, filed Jan. 22, 2007.

Response to Office Action dated Sep. 2, 2010 in U.S. Appl. No. 11/625,819, filed Jan. 22, 2007.

* cited by examiner

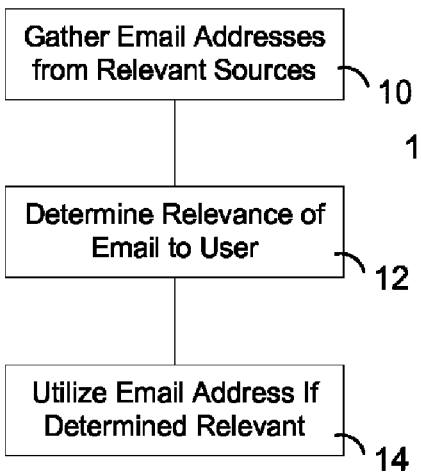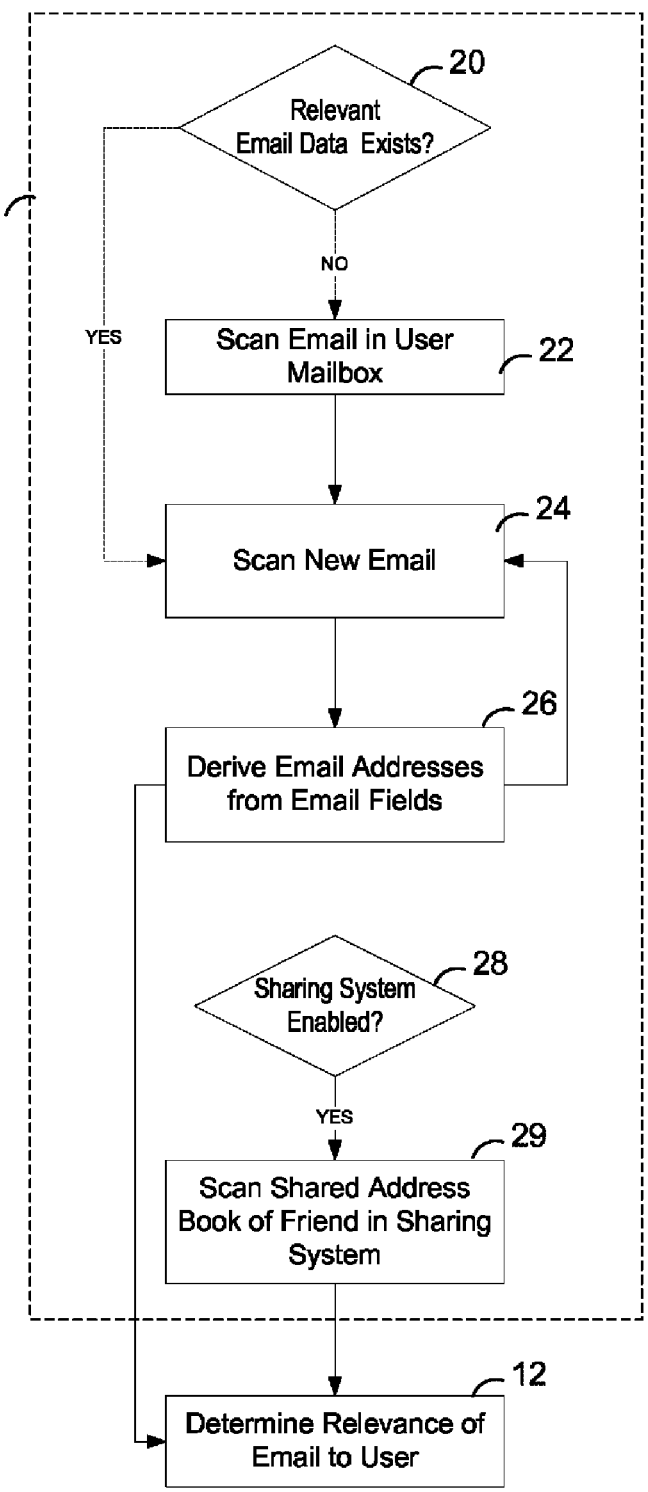

FIG. 3a

Determine Relevance of Email to User

For Each Email

Mark any received email as relevant;
    Apply subtraction heuristic

Subtract if not seen in outbound in x time

And/or

Subtract if not seen in additional emails

End For

FIG. 3b

For Each Email

Determine relevance factor

-If appearance with other known emails, assign weight based on number of emails in address book found in message -If appears with other known emails, assign weight based on number of emails in address book found in message relative to number of unknown -If appears in multiple emails, assign weight based on frequency of appearance over a number of emails -Assign weight based on location/source of appearance (blog, which email field, shared user's address book)

- Assign weight based on frequency or appearance of email address within the message (i.e. in a reply string within the email)

If relevance greater than assigned weight, add to relevance data

End For

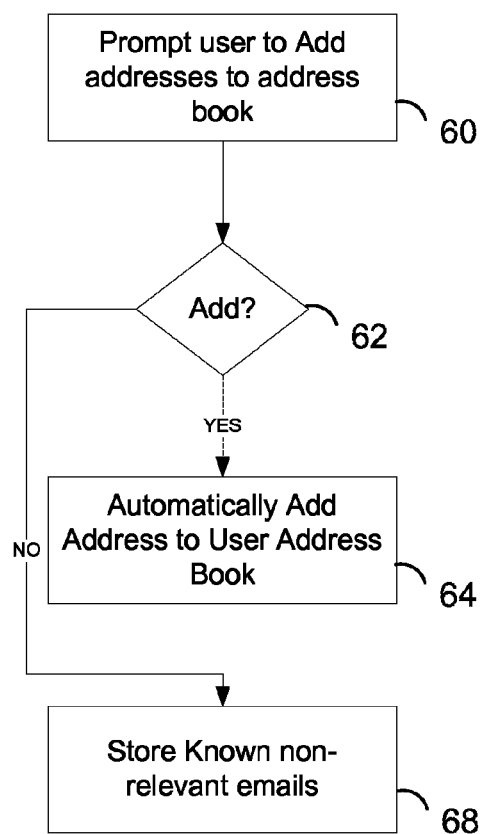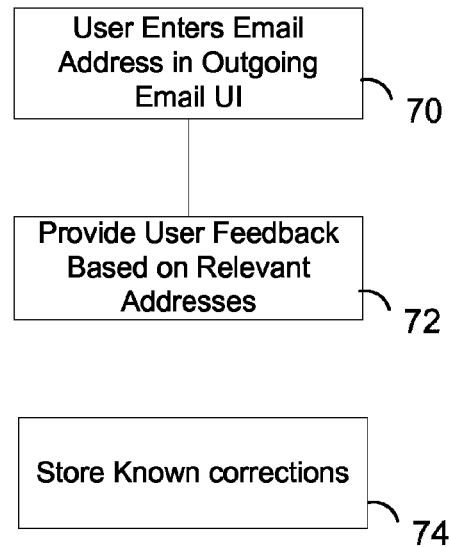

EMAIL ADDRESSES RELEVANCE DETERMINATION AND USES

BACKGROUND

Electronic forms of communication such as email and instant messaging allows users to easily interact with a large number of contacts. A number of tools have been provided with communication applications which allow users to manage large numbers of contacts and potential contacts. As the use of email increases, the potential for communication to be addressed incorrectly likewise increases. Email address take the well known format "user@domain", where "user" is a unique user identifier at a given "domain name" address. A domain name is the unique name of a computer on the Internet that distinguishes it from the other systems on the network. Every website, email account, etc, on the Internet is hosted on at least one computer (server) having a unique IP address. Because it is difficult to remember user addresses, many email programs allow users to simply type a portion of an address after which the application will suggest one or more addresses to the user based on the information the user has typed. Generally these suggestions come from a user address book maintained in conjunction with the communication application. In many cases, email and messenger applications can share the information in the address book.

Various mechanisms exist to allow a user to create and populate electronic address books. Address books contain not only the electronic addresses of users, but terrestrial addresses, nicknames of contacts, and other information allowing contacts in the address book to be organized by the users. Various import routines allow a user to import text files, and address books from other address book programs into the address book. Other mechanisms allow users to easily add addressees of email or instant messages to their address book. Many of these mechanisms are based on pulling addresses from the "to" field in a sent e-mail message (outbound message from the user), or scanning a user's address book or message folder, for addresses which populate distinct fields.

Those systems which suggest email addresses to users when the users are composing an email message benefit from accurately populated address books.

SUMMARY

The technology, roughly described, includes a computer implemented method for assisting email and instant messaging users. The method determines the relevance of email addresses to users and utilizes the relevance information to assist users in addressing emails. The method may include gathering email addresses from one or more sources including inbound user emails associated with an email user, and determining a relevance of the email address to the user based on a heuristic. Once relevance is determined, the method includes applying relevant email addresses to a user's store of relevant addresses.

In another implementation, the method includes monitoring inbound emails for a user and extracting one or more email addresses from each email message. Once email addresses are extracted, for each email, the relevance of one or more addresses to the user is determined and this information applied to indicate potential email address problems to the user.

In another implementation, a computer implemented method for assisting email users includes gathering email addresses from one or more sources including inbound user emails associated with an email user. The technology then determines the relevance of the email address to the user based on a heuristic, to provide a relevant email address. Upon the user addressing a new email, the technology checks at least one address field of said email and determining whether an email address entered in said field is correct against a relevant email addresses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 depicts a general method in accordance with the technology discussed herein.

FIG. 2 depicts a method for gathering relevant email addresses.

FIGS. 3a and 3b depict various heuristics used in accordance with the technology for determining the relevance of an email address.

FIG. 4 depicts a method for assisting a user utilizing a relevant email address.

FIG. 5 depicts a second method for assisting a user utilizing a relevant email address.

DETAILED DESCRIPTION

Figure 6:
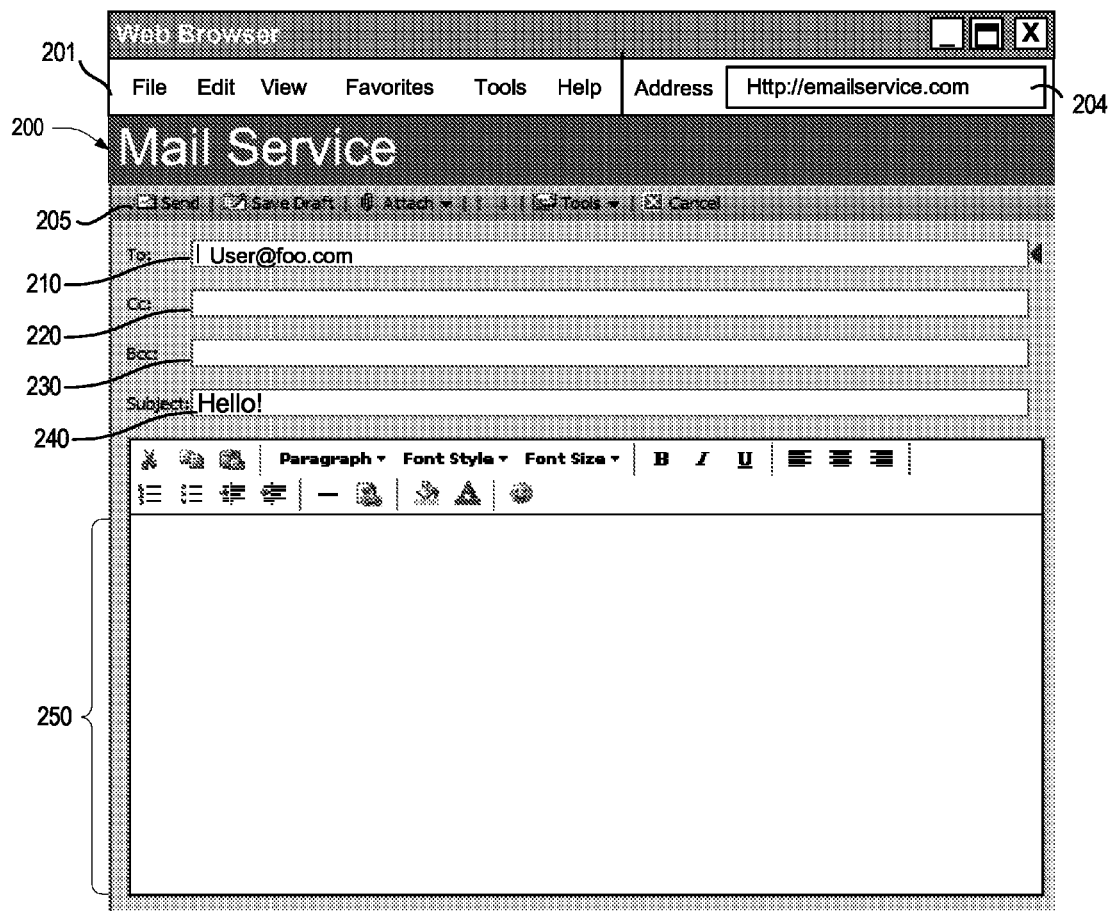
FIGS. 6 and 7 depict a user interface suitable for use with the technology.

Technology is provided which provides a user with a mechanism for collecting and utilizing e-mail addresses based a determined relevance of the email address to the user. The technology gathers potentially relevant email addresses from various sources, and determines potential relevance of the address to the user. Addresses determined to be potentially relevant may then be put to any number of uses by electronic communication programs. The technology therefore makes a user's online communication experience with other users simpler and better.

FIG. 1 illustrates a general method in accordance with the present technology. At step 10, in accordance with the technology, e-mail addresses from relevant sources are gathered. As will be discussed below, gathering e-mail messages may comprise constantly scanning a user's inbound and outbound e-mail messages for e-mail addresses in the TO, FROM, SUBJECT, CC, BCC and MESSAGE BODY fields of an email message. In other aspects, the user's mailbox folders may be scanned, or e-mail addresses may be retrieved from other users who share their address book in systems which allow sharing of online or server based address books.

At step 12, once a set of relevant e-mail addresses is gathered, for each e-mail address, the relevance of the e-mail to the user is determined. As will be discussed below, the relevance of the e-mail may be determined by any number of different heuristics. One heuristic would simply be to mark the e-mail as relevant and retain it for a specified period of time during which the user is required to send at least one e-mail to this address. If no e-mail is sent to the address within a specific period of time, the relevance of the e-mail is discarded. Other heuristics are described herein.

Finally, at step 14, the set of relevant e-mail addresses may be utilized in different manners to allow a user experience to be improved in electronic communications systems. In one embodiment, the technology supplies relevant email addresses to be utilized to auto complete and/or auto correct entries made in email messages, supplanting or supplementing email messages in a user address book. In alternative embodiments, these addresses may be automatically added to a user's address book, or may be added based upon a prompt to the user requesting whether the user wishes the information added to the user's address book.

FIG. 2 illustrates a method in accordance with the technology for gathering e-mail addresses as noted in step 10 in FIG. 1. At step 20, a determination is made as to whether any relevant e-mail data already exists. When the technology is implemented on a system for which no previous relevance determinations have been made, a number of potentially relevant e-mail addresses may be present in a user mailbox, including the user's inbox and/or other folders of a user's message store. In one embodiment, the technology allows for gathering those email addresses by scanning the email in a user's mailbox s.

Relevance data may be stored in a number of ways. Many address book systems allow for the addition fields or other data associated with contacts. In one embodiment, relevance data is stored in the address book of a user with the contact in manner which marks them as relevant to the user. For example, the addresses may be marked in a user's e-mail address program or online e-mail service address book and delineated by an additional field, or other indicator indicating they were marked as relevant by the technology in accordance with the present technology. Alternatively, a separate data store of relevant addresses may be stored in conjunction with the email or instant messaging program and associated with the users.

If no e-mail relevance data exists at step 20, in one embodiment, a scan of e-mail in the user's mailbox may be made at step 22. In accordance with this technology, the scan is performed by looking for e-mail addresses in the TO, FROM, SUBJECT, CC, BCC and MESSAGE BODY of a message. E-mail addresses found in the body of a message may be found in signatures, and in "replies" or "forwards" from other users. These e-mail addresses, and the manner in which the e-mail addresses were found, can be used in step 12, further delineated below, to determine the possible relevance of each e-mail address found in the mailbox of the user.

If relevant e-mail data already exists, (or if, per the configuration of the technology, steps 20 and 22 are not utilized) at step 24, e-mails to and from a particular user are scanned. In one embodiment, emails to a particular user (inbound emails) are scanned. In alternative embodiments, various portions of outbound emails are scanned. For example, an email address may be sent to a user from another user in the body of a message and may be held by the receiving users for some period of time. When the receiving user receives or uses that email address, or forwards that address, it is a potentially relevant address for the receiving user. In accordance with the present technology, any portion of inbound or outbound messages may be scanned. At step 26, e-mail addresses found in the TO, FROM, SUBJECT, CC, BCC and MESSAGE BODY are parsed and subjected to a relevance determination at step 12 (in FIG. 1).

In yet another embodiment, if the e-mail address book is part of a sharing system such as Spaces.MSN.com, Yahoo 360, or the like, users may have the ability to share address book information with other users. For example, when marking a user as a "friend" a user's address book may be shared with other users. At step 28, if a sharing system is enabled, e-mail addresses may be derived from "friend's" address books at step 29. Again, such email addresses may then be such all cases, incoming e-mail is constantly scanned at step 24 and e-mail addresses derived from e-mail fields at step 26. All e-mail addresses derived from either steps 22, 26, or 29 are subject to a relevance determination at step 12. In yet another alternative, the scanning which occurs at step 29 may include to deriving e-mail addresses from any user's favorite blog source or website.

In yet another embodiment, email addresses may be culled from recently viewed and/or cached web pages. A browser plug-in may be used to view Web pages viewed as they are viewed by the user. In addition, most Web browsing applications store recently viewed web-pages for some amount of time to speed rendering the page to the user. Email addresses in these viewed or cached pages may be culled as the user views pages and the relevance of the email determined to the user. A threshold for determining whether to cull addresses from a recently viewed web page may include the number of times the user has viewed a page over some period of time. In one embodiment, addresses are culled from frequently viewed pages.

In an alternative embodiment, addresses may be culled from other sources on in a storage device. For example, addresses may be derived from any user file on a hard drive. Searching each file for a string of text may be done on a file-by-file basis, or one may leverage existing desktop search technologies (such as MSN Desktop Search or Google Desktop) which build indexes of user defined files on a hard-drive. Culling addresses from such a file index may be done on the fly or after the index is built. Other sources, such as the Microsoft Windows Address Book or the Microsoft Outlook Address Book, may likewise serve as a source of email addresses for use in the method herein.

In embodiments where email addresses are determined from, for example, the body of an email message or a recently viewed Web page, email addresses can be determined programmatically though use of a regular expression which searches for patterns surrounding the use of an "@" symbol in the page. Any number of expressions can be used to cull potentially relevant email addresses from the various sources identified herein. One of average skill in the art could construct program code to search a body of text for addresses in accordance with the email addressing standards set forth in, for example, Internet Engineering Task Force RFC 2821, 2822 and other email standards.

FIGS. 3*a* and 3*b* illustrates a set of heuristics which may be utilized for determining whether an e-mail address is relevant at step 12. In FIG. 3*a*, one heuristic which may be applied at step 12 to determine the relevance is to simply mark any received e-mail relevant and apply a subtraction heuristic. In one embodiment, for each email received, the email is marked as relevant and a subtraction heuristic applied. The subtraction heuristic may be to subtract the e-mail from relevance if an outbound message to the user is not seen in some specified amount of time. A second subtraction heuristic might be to subtract the e-mail relevance if an inbound e-mail from the same address is not received within a predetermined amount of time. A third heuristic might be to combine the aforementioned require both an outbound message within a particular amount of time and an inbound message within a same or different amount of time, or to use either heuristic of FIG. 3*a* or 3*b* exclusively, or to require at least one of the rules in FIG. 3*a* or 3*b*.

A second set of heuristics is shown in FIG. 3b. In this instance, an e-mail address is marked as relevant if it exceeds a predetermined relevance factor. For each email address received, a relevance factor may be assigned based on any number of different criteria including, for example, the appearance of an e-mail address with other known e-mail addresses found in a user's address book. This may include marking the e-mail address as relevant simply if it appears in a message with an e-mail address from the user's address book. Alternatively, where a number of e-mail addresses appear in a message, determining the total number of known and unknown e-mail addresses found in the message, and marking the e-mail addresses not known as relevant based on the percentage of known addresses to the total or the ratio of known addresses to unknown addresses. Various permutations of this particular heuristic exist, and the determination of ratios and percentages utilized to determine relevance may vary according to environment. In an alternative embodiment, this application of heuristics may be configurable by a user.

Another relevance factor which may be applied is the frequency of appearance of an e-mail address over a number of e-mails in time. For example, if an e-mail address is received once a year, it may not be marked as relevant. However, if an e-mail address is received once a week, it may be determined that the e-mail address is relevant and may be acted upon accordingly as discussed below. Similarly, an email address seen persistently over time may have a longer term relevance than one which appears transiently. Another heuristic which may be applied is the location of the appearance of an e-mail. If an e-mail address appears in a FROM field, it may be marked as a higher relevance than one which appears in a MESSAGE BODY of an e-mail message. Yet another heuristic which may be applied is the frequency of appearance of an e-mail within a body of a message. In many cases, a thread of e-mails may contain the same e-mail address several times as users forward and reply messages over time. If a particular e-mail address appears with great frequency in the body of a message, this may indicate that the user is part of a thread on an e-mail message string, and the e-mail addresses in the thread therefore have a greater significance to the user.

Still another alternative heuristic is to add any e-mail address received in any e-mail message over a given set sampling of e-mails. Any number of statistical sampling factors may be utilized to determine, over a given set of e-mails, which e-mails to pull addresses from, and all e-mails from those addresses may be added, or may be subject to any one of the other heuristic sets described above.

In all such cases, if the relevance assigned by any one (or more) of the heuristics illustrated in FIG. 3b is greater than a predetermined weight, the e-mail address may be marked as relevant.

Once relevance data for email addresses exists, it may be utilized in a number of ways. FIG. 4 is a method illustrating how the technology of the present technology may utilize the e-mail relevant data to provide a better user experience in accordance with step 14 discussed above. In one embodiment, at step 60, when an e-mail addressed is marked relevant, the technology may prompt the user to determine whether the user wishes to add the address to the address book. If a user selects to add the address at step 62, the address may be added at step 64. The prompting may be passive—that is, contextually rendered into the user experience without being modal. Alternatively, the e-mail addresses may be automatically added to a user's address book without prompting. In yet another alternative, at step 68, known non-relevant e-mail addresses, or those which the user has automatically decided not to add to the address book or affirmatively decided not to add, may be stored as known non-relevant e-mails at step 68.

Figure 7:
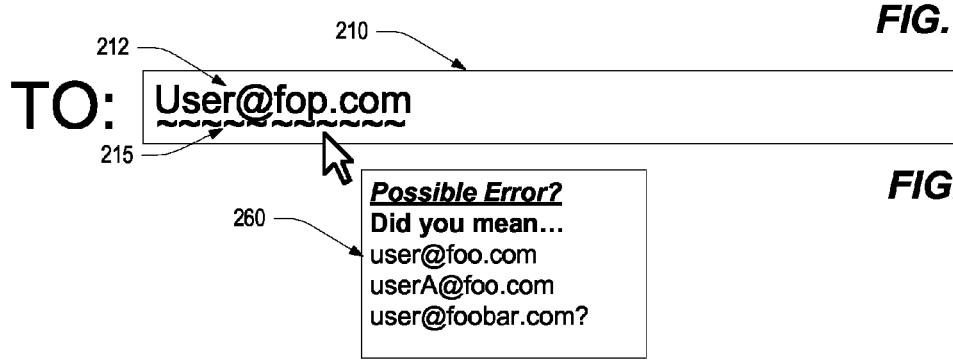

FIGS. 5, 6 and 7 illustrate another use for the relevance information discussed above. In FIG. 5, when a user enters an e-mail address in an outgoing e-mail user interface at step 70, the system of the present technology can provide feedback at step 72 based on the relevant e-mail address. In one embodiment, the feedback may be a user prompt indicating that the technology does not recognize the address as either an address from the user's address book or an email address marked relevant. In another embodiment, the marking may be different for an email address from a user's address book versus one determined relevant by the mechanisms previously discussed. In another embodiment, the system may spell check the email against known relevant or address book entries and suggest alternatives. If a user makes a correction to the e-mail address as discussed above, the system can store the known corrections at step 74 and gain intelligence about correcting the user's errors going forward. In a further embodiment, the spell check may be initiated by the user or automatically in the background.

FIG. 6 shows an exemplary email composition screen such as that which may be provided by an email service provider via a web interface. The interface may be provided in a web browser page 200. A typical browser application may provide elements such as a menu-bar 201 to implement browser specific instructions, and an address bar 204 allowing the user to enter the uniform resource locator (URL) of the web address the user wishes to view, such as that of the email service provider.

A typical composition interface 200 will include a function menu 205 allowing the user to "send" or "save as draft" a copy of the message, attach a file to the message, set a priority to the message or access other tools to compose the message, such as a spell checker. Components of the composition interface 200 are accessible to a computer user via the computer's interface, typically a graphical user interface which includes a display element selection device such as a pointer or cursor, activated by a mouse or keyboard. Interface 200 also includes a "TO:" field 210, a "CC:" field 220, a "BCC:" field 230, a "SUBJECT" field 240 and a "MESSAGE" field 250.

Although the interface depicted in FIG. 6 is a web-based interface, it will be readily understood that the technology is not limited to a web-based email system. Most email client interfaces include the standard elements of a TO, CC, BCC, SUBJECT and MESSAGE FIELD, and the technology could be readily utilized with any such email client. Such email clients can include Microsoft's Outlook®, and Outlook Express®, among others.

Many users compose a message by first entering the address in the "TO:" field 210. Next, they will move the active cursor to another field to continue entering the message. When the cursor is moved to the next field (after completion of the "TO" line), in one embodiment, the email address checked against address book and/or addresses marked relevant. In another embodiment, the email address is gathered when the user selects to "send" the message, or uses a "spell check" function. The technology thus contemplates checking the email address while the user is composing other portions of the message, or waiting until email submission. Alternatively, a communication is made to the user (via a squiggly, or prompt, etc., illustrated in FIG. 7) that the user may have misspelled an address and provides suggestions for correction, as discussed below. Alternatively, the check can be made at timed intervals.

In one embodiment, relevance information for given addresses may be used alone, or in conjunction with user's address book information, to provide suggestions on correct email addresses via window 260. Window 260 may be displayed by a mouse-over event on the TO field, on a right click by the user on any portion of the email address, or as a pop-up when the user selects to send a message or moves to a different field. These suggestions may be culled from the user's address book, sent items, or a data store of similar domains to which email has been successfully routed.

FIG. 7 illustrates an enlarged portion of the interface screen of FIG. 6 showing one manner of illustrating a problem with the email address entered to the user. Where the technology has determined that the email entered does not match a relevant email, the interface can display an underscored "tilde" mark in various colors which change based on the nature of the determination. This display is similar to the manner in which many well known web-based email servers display indications of incorrect spellings in a compose screen when a user runs a spell check program on the proposed message text. In one aspect, this can be implemented by instructing a web-browser to render the text in the field with a style sheet definition. Alternative displays include changing the color, font or style of the text displayed in the TO window, or highlighting the text. Further alternatives include providing audible signals to the user.

In one alternative, tildes are displayed in a first color (for example, yellow) under the entire address (on both sides of the "@" sign), when a spell check error is indicated. In another alternative, the color red may be used for "known bad" email addresses, irrespective of the reason the address is bad. Common spell checking algorithms can be used to check first for address syntax errors (for example, two @@ signs or incorrect Top Level Domains). In still another alternative, tildes are displayed on different sides of the @ sign in for different purposes. Tildes under the addressee name may indicate an incorrect username portion of the address, while tildes under the domain name may indicate a spelling problem in the domain name derived from the known relevant email addresses, or another means. Such other means may be, for example, the domain check technology disclosed in U.S. patent application Ser. No. 11/085,373 entitled EMAIL ADDRESS VERIFICATION, inventors, Jason Walter, Aditya Bansod and Eliot Gillum, filed Mar. 21, 2005. In a still further alternative, indicators on the same side of the @ sign can be colored differently. For example, using the EMAIL ADDRESS VERIFICATION techniques, a red tilde indicator may indicate that the domain is a "known-bad" domain, while a yellow indicator indicates a potential spelling error relative to the relevant email address store.

Yet another color may indicate an improper email or domain syntax in the address. In an alternative embodiment, the color may be representative of the degree to which the correction is known. For example, when it is clear the email will not succeed as currently addressed, the color red might be used. Yellow might then be indicative of the presence of a suggestion which lacks the above certainty.

Various well known spell checking algorithms may be utilized to determine whether an email entry is similar enough to be considered a match against known or known-relevant addresses. Any one or more of such algorithms may be used to determine whether to indicate a problem in the TO field.

In another embodiment, if a determination is made that an email may be improperly addressed, suggestions may be provided as shown in FIG. 7. This may include suggesting corrections to misspellings and suggesting corrections to user addresses for different domains. For example, if a user addresses an email to user@foo.com, but relevant email addresses have been found for userA@foo.com or user@foobar.com, the system may suggest these alternatives using the prompt box 260 shown in FIG. 7. Semantically similar user names alternatives may indicate that the user has more than one email domain or a slight variance in user name at different accounts. The appearance of relevant emails from semantically similar usernames may indicate (or remind) the sending user that the addressee has change email addresses or domains.

Figure 8:
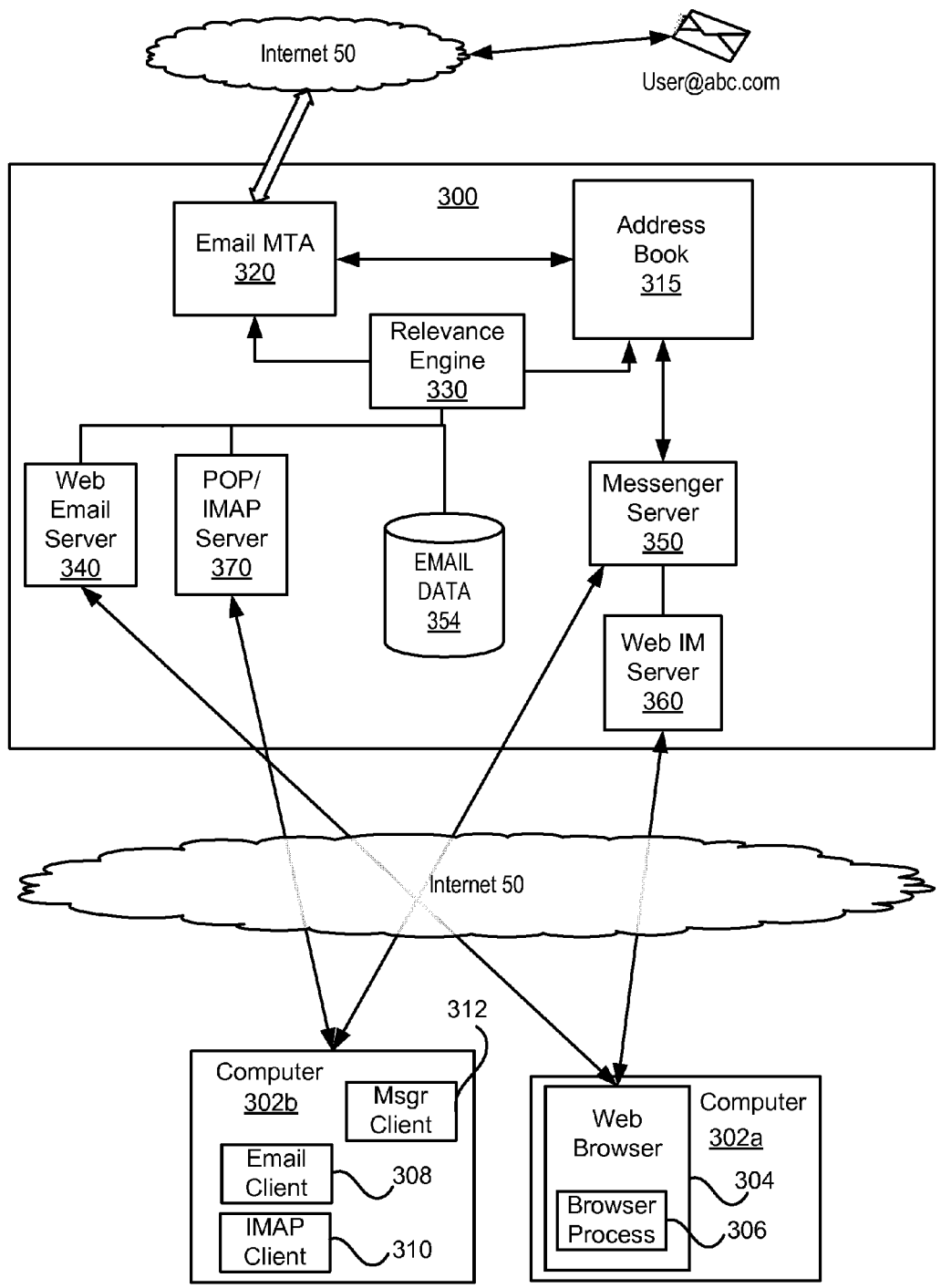
FIG. 8 depicts a first system suitable for implementing the technology discussed herein.

Various alternatives of the technology may be implemented on different systems. FIG. 8 illustrates an e-mail system which may be provided in a web-based environment by a system administrator. An e-mail system 300 includes an e-mail message transfer agent (MTA) 320 which accepts and forwards e-mails provided from a LAN, WAN, or Internet from and to an email data store 354. An e-mail address book 315 may be a shared address book providing address book information to any number of different users applying to the service provided by service provider 300. A message transfer agent 320 receives and forwards emails for users who subscribe to system 300. Users access email data store 354 maintained by the system 300 via a number of interfaces. A relevance engine 330 (which may be a stand alone program or component of the MTA or address book database) interacts with the e-mail MTA to perform the methods discussed herein. System 300 may include a web-based e-mail server 340 which provides a browser based user interface access to e-mail data 354 to client's operating computers 302A utilizing a web browser and a browser process 306. A pop/IMAP server 370 may provide e-mail access to users operating a computer 302B having, for example, an e-mail client 308, or an IMAP client 310, and/or messenger client 312. System 300 includes a messenger service server 350 and a web instant messenger server 360 which provide an instant messaging service to the users operating various computers who subscribe to system 300. In accordance with the technology herein, the address book may be shared between various users of system 300, and by the messaging server 350. E-mails determined as relevant by the relevance engine 330 may be marked and provided to the users as discussed above.

Figure 9:
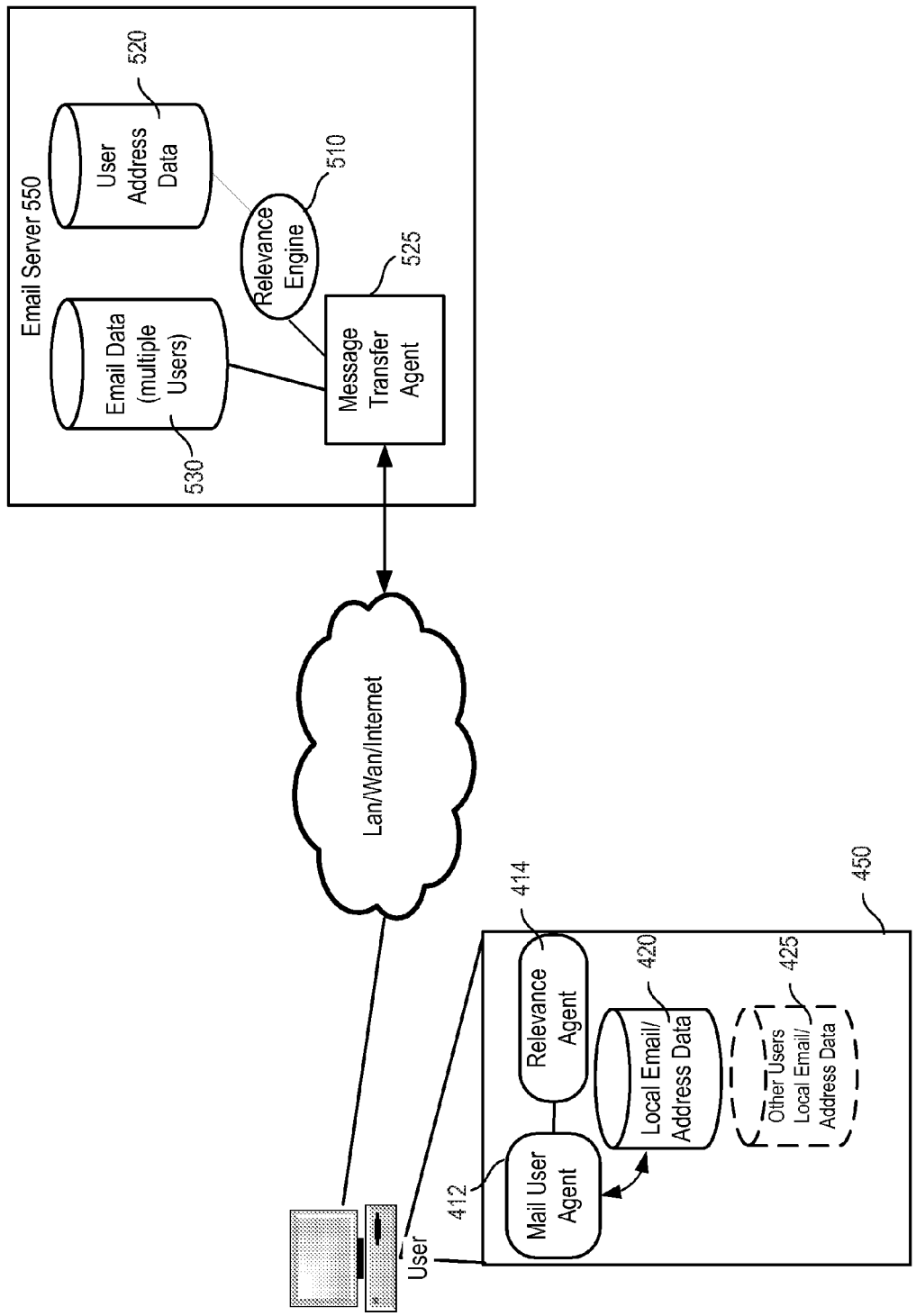
FIG. 9 depicts a second system suitable for implanting the technology discussed herein.

In another alternative, the relevance engine may be provided on a stand alone e-mail server 550, or a client device 450 shown in FIG. 9. E-mail server 550 may be an e-mail server such as Microsoft Exchange 2003 and include an e-mail data store 530 showing e-mail data from multiple users, and a user address data store 520. The Address store 520 may include information for a number of users, and such users may share address book information with each other. Server 550 includes an MTA 525 which accepts and forwards e-mails provided from a LAN, WAN, or Internet. A relevance engine 510 communicates with the address data store 520 and MTA 525 in accordance with the methods discussed herein.

Likewise, a relevance engine 414 may be provided on a client device 450. The client device 450 may include a mail user agent 412 such as Microsoft Outlook, Eudora, or any other well-known e-mail client, and may include a local e-mail and address database 420, as well as other local e-mail and address databases for other users 425. As is well known, various operating systems maintain segregation between different users, and in one embodiment, the step of scanning various e-mail addresses described above with respect to step 24 may include scanning the address books of other users 425 on a local device. A relevance agent 414 interacts with e-mails derived from the mail user agent which may be accessing e-mail server 550, or web e-mail server 340 in FIG. 8, to provide relevance information at the client level on a local processing device local to the user.

Figure 10:
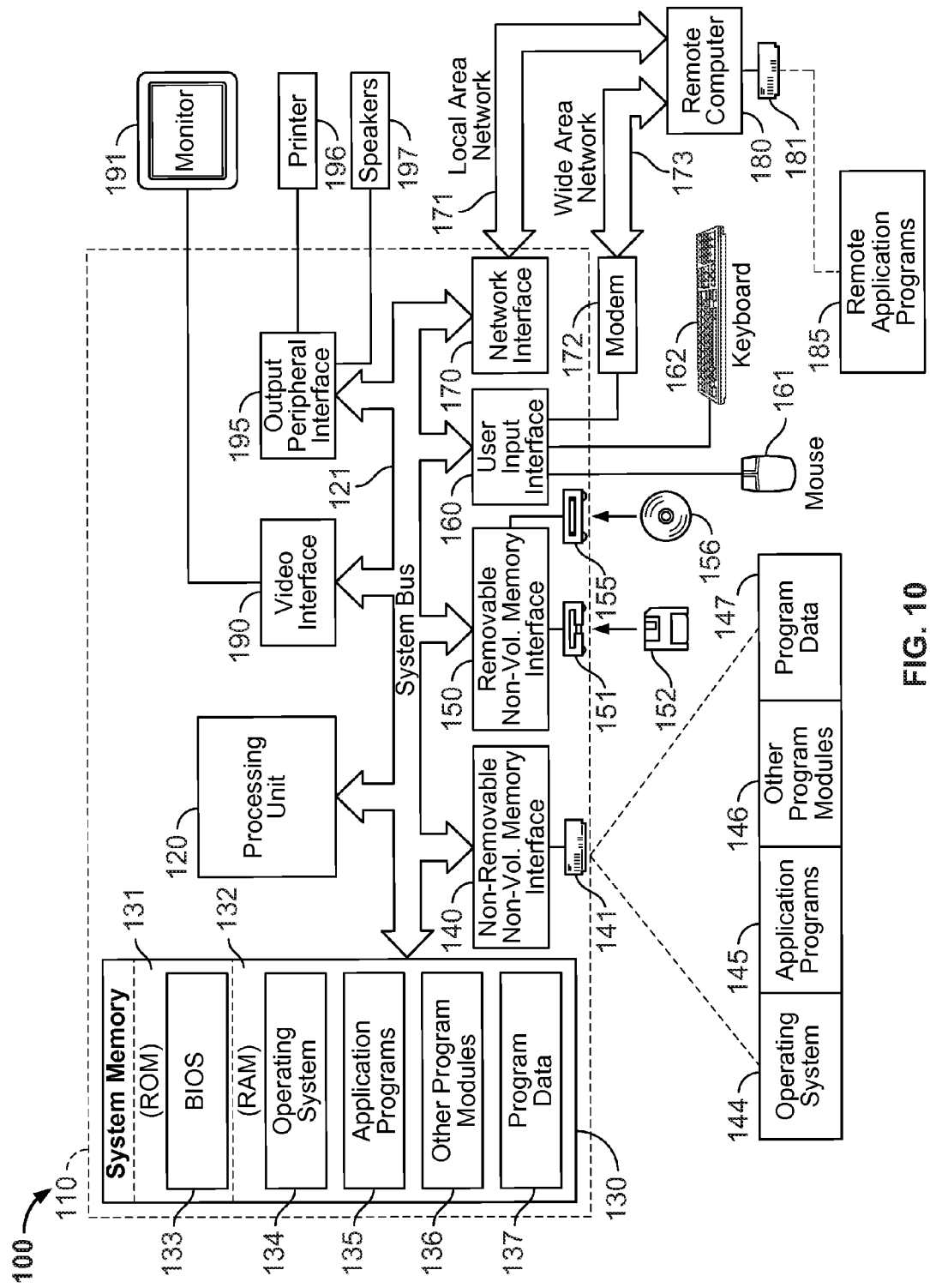
FIG. 10 depicts a processing system suitable fur use in the systems described with respect to FIG. 8 or 9.

Client device 450 and e-mail server 550 may be a processing device such as that described with respect to FIG. 10. With reference to FIG. 10, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181.

It will be appreciated that the network connections shown are exemplary and other means of establishing a communications link between the computers may be used.

The present technology solves a number of problems with users addressing incorrect emails. Currently, if a user addresses an email incorrectly, it may be several days before the user receives a non-delivery receipt (NDR). The technology addresses this issue by correcting email addresses before emails are sent by the user. In addition, users who deal with large volumes of mail and addressees may sometimes be less than diligent in updating their address books. The technology provides an easy mechanism to these users to keep their address books up to date.

In still another alternative, the store of relevant email addresses (and/or) known non-relevant addresses (from step 68) may be stored separately from a user address book. Search functionality which is normally extended to user address books through known search technologies may then be extended to this addresses stored in this separate store. In addition, editing functions may be provided to the user allowing the user to update information in the store directly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method for assisting email users, comprising:
    providing an address store associated with a user;
    gathering email addresses from at least one archive and constantly scanning new inbound emails addressed to the user on receipt and new outbound emails from the user for email address information;
    determining a relevance to the user of one or more email addresses in an email message addressed to the user based on a heuristic, the heuristic weighting the relevance relative to a repeated appearance of the one or more email addresses, wherein determining the relevance based on the heuristic further comprises:
        determining if the email message addressed to the user includes more than one email address;
        computing a ratio of known email addresses to unknown email addresses in the email message based on the determining;
        assigning a relevance weight to the unknown email addresses in the email message based on the ratio; and
        marking the email addresses in the email message that are unknown as relevant if the relevance weight exceeds a pre-determined value;
    storing relevance information for an email address in the user address store and storing non-relevant email addresses for the user; and
    altering an email messaging user interface presented to the user based on stored relevant and non-relevant information for an email address.

2. The method of claim 1 wherein the step of gathering comprises retrieving emails from one or more of: a user's mailbox, a blog identified by the user, a website identified by the user and/or a user email folder.

3. The method of claim 1 wherein the step of gathering includes parsing email addresses from inbound emails addressed to the user on receipt.

4. The method of claim 1 wherein the heuristic comprises marking any email address as relevant and applying a subtraction algorithm.

5. The method of claim 4 wherein the subtraction algorithm is at least one of:
    marking the email address as not relevant if a new email containing said address is not received in a pre-determined amount of time and/or
    marking the email address as not relevant if a new email containing said address is not received in a pre-determined number of emails.

6. The method of claim 1 wherein the heuristic comprises assigning a relevance weight to a received email address and marking it relevant if the weight exceeds a pre-determined value.

7. The method of claim 6 wherein the step of assigning comprises at least one of assigning a weight based on:
    a number of email addresses found in a users address book also found in a message;
    a number of emails found in a users address book also found in message relative to number of unknown email addresses in the message;
    a frequency of appearance of an email address in a number of emails addressed to the user;
    a persistence of time in which the email address appears;
    a location of an appearance of an email address in a message;
    a source of an appearance of an email message; and/or
    a frequency of appearance of email address within a message.

8. A computer implemented method for assisting email users of an email system, comprising;
    providing an address store and email store for a user;
    gathering email addresses from a plurality of data sources including stored email;
    monitoring email correspondence for a user including constantly scanning new inbound emails to the user on receipt and outbound emails from the user;
    extracting one or more email addresses from each email message associated with the user in the plurality of data sources, and the inbound and outbound messages;
    determining a relevance to the user of one or more addresses extracted from the data sources or email messages, the relevance being determined based on a heuristic evaluating an appearance of the one or more email addresses relative to other email addresses, wherein determining the relevance based on the heuristic further comprises:
        computing a percentage of known email addresses to the total number of known email addresses and unknown email addresses in each of the inbound messages and outbound messages addressed to the user;
        assigning a relevance weight to the unknown email addresses in each of the inbound emails and outbound emails based on the percentage; and
        marking the email addresses in each of the inbound emails and outbound emails that are unknown as relevant if the relevance weight exceeds a pre-determined value; and
    based on said determining step, upon input of an address by a user into an email composition user interface, altering the interface to display a visual indicator to indicate potential email address problems to the user.

9. The method of claim 8 wherein the step of displaying includes displaying a first visual indicator for a known-bad email address and a second visual indicator for an address which may be problematic.

10. The method of claim 8 wherein the step of monitoring includes monitoring inbound messages on delivery and outbound messages on transmission.

11. The method of claim 8 wherein the step of determining includes marking any email address as relevant and applying a subtraction algorithm.

12. The method of claim 11 wherein the subtraction algorithm is at least one of:
    marking the email address as not relevant if a new email containing said address is not received in a pre-determined amount of time; and/or
    marking the email address as not relevant if a new email containing said address is not received in a pre-determined number of emails.

13. The method of claim 8 wherein the step of determining comprises assigning a relevance weight to a received email and marking the mail as relevant if the weight exceeds a pre-determined value.

14. The method of claim 13 wherein the step of assigning comprises at least one of assigning a weight based on:
    a number of email addresses found in a users address book also found in a message;
    a number of emails in found in a users address book also found in message relative to number of unknown email addresses in the message;
    a frequency of appearance of an email address in a number of emails addressed to the user;
    a persistence of time in which the email address appears;
    a location of an appearance of an email address in a message;
    a source of an appearance of an email message; and/or
    a frequency of appearance of email address within a message.

15. A computer implemented method for assisting email users of an email system, comprising:
    providing an address store associated with a user and providing a user interface allowing the user to interact with the email system to send outbound email and receive inbound email;
    gathering email addresses from one or more sources including constantly scanning inbound user emails on receipt and outbound user emails associated with an email user;
    determining a relevance of the email address to the user based on a heuristic to provide a relevant email address, the relevance being determined based a heuristic evaluating an appearance of the one or more email addresses relative to other email addresses and a heuristic evaluating a frequency of appearance of the one or more email addresses in the address store or the inbound or outbound user emails, wherein determining the relevance based on the heuristic further comprises:
        determining if each of the inbound emails and outbound emails addressed to the user includes more than one email address;
        computing at least one of a percentage of known email addresses to the total number of known email addresses and unknown email addresses or a ratio of known email addresses to unknown email addresses in each of the inbound emails and outbound emails addressed to the user;
        assigning a relevance weight to the unknown email addresses in each of the inbound emails and outbound emails based on at least one of the ratio or the percentage; and
        marking the email addresses that are unknown as relevant if the relevance weight exceeds a pre-determined value;
    marking addresses determined to be relevant to a user in the address store and storing non-relevant email addresses for the user; and
    upon the user addressing a new email, checking at least one address field in said user interface of said email and determining whether an email address entered in said field is correct against a relevant email addresses, and altering the user interface to display a visual indicator to indicate potential email address problems to the user.

16. The method of claim 15 wherein the step of determining includes at least one of:
    marking the email address as not relevant if a new email containing said address is not received in a pre-determined amount of time; and/or
    marking the email address as not relevant if a new email containing said address is not received in a pre-determined number of emails; and/or
    assigning a relevance weight to a received email and marking the mail as relevant if the weight exceeds a pre-determined value where the value is assigned based on:
        a number of email addresses found in a users address book also found in a message;
        a number of emails in found in a users address book also found in message relative to number of unknown email addresses in the message;
        a frequency of appearance of an email address in a number of emails addressed to the user;
        a persistence of time in which the email address appears;
        a location of an appearance of an email address in a message
        a source of an appearance of an email message; and/or
        a frequency of appearance of email address within a message;
    marking the email address as not relevant if a new email containing said address is not received in a pre-determined number of emails.

17. The method of claim 15 wherein the step of checking includes spell checking the email address entered against a user address book and a relevant email address.

18. The method of claim 17 wherein for an entered email address failing a spell check, providing a visual indicator noting a problem with the entered address.

19. The method of claim 18 wherein the step of providing a visual indicator includes providing a first indicator for an error in the entered address relative to a relevant address and a second indicator for an error relative to an address in a user address book.

20. The method of claim 18 wherein the step of providing a visual indicator includes providing a plurality of suggested corrections to the user-supplied address.

* * * * *